United States Patent [19]

Goldberg

[11] Patent Number: 4,958,310
[45] Date of Patent: Sep. 18, 1990

[54] DIGITAL FREQUENCY SYNTHESIZER HAVING MULTIPLE PROCESSING PATHS

[76] Inventor: Bar-Giora Goldberg, 8401 Aero Dr., San Diego, Calif. 92123

[21] Appl. No.: 122,946

[22] Filed: Nov. 19, 1987

[51] Int. Cl.[5] .............................................. G06F 1/02
[52] U.S. Cl. .................................................... 364/718
[58] Field of Search ................................. 364/718–721

[56] References Cited

U.S. PATENT DOCUMENTS

| | | | |
|---|---|---|---|
| 4,068,178 | 1/1978 | Tuzi ..................................... | 364/718 |
| 4,486,846 | 12/1984 | McCallister et al. ................ | 364/721 |
| 4,710,891 | 12/1987 | Debus, Jr. et al. ................... | 364/718 |

*Primary Examiner*—Dale M. Shaw

[57] ABSTRACT

A digital-to-analog converter receives buffered data words from a multiplexer having "N" inputs, each input receiving data from one of N processing paths, each path having a memory therein which provides the data. Each memory receives address information from a variable-increment counter in its path. The counters are initialized by an offset loader when a frequency is selected. The initialization is a two step process: (1) the counters are loaded with an initial value, and (2) an increment register is loaded with a number equal to N times a primary incremental value corresponding to the frequency. Initially, a first path counter is set to zero, a second path counter is offset by the incremental value, a third path counter is set to twice the incremental value, and so on until the last counter is offset by N−1 times the incremental value. Thereafter all path counters are sequentially incremented by the primary incremental value times N in order from first to last in cycles, and the data from the paths are selected by the multiplexer in the same order. The clocking of each path counter in a cycle precedes the selection of the path by a portion of the cycle sufficient to allow each path time to complete its incrementing process and have settled data at its respective multiplexer input before it is again selected.

10 Claims, 2 Drawing Sheets

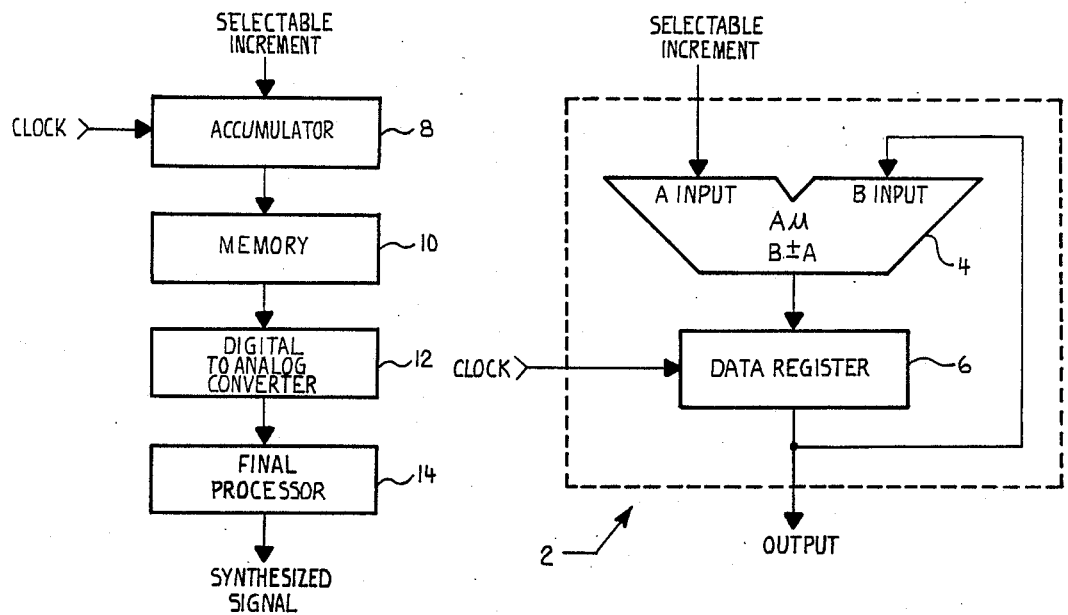
FIG. 1 PRIOR ART
FIG. 2 PRIOR ART
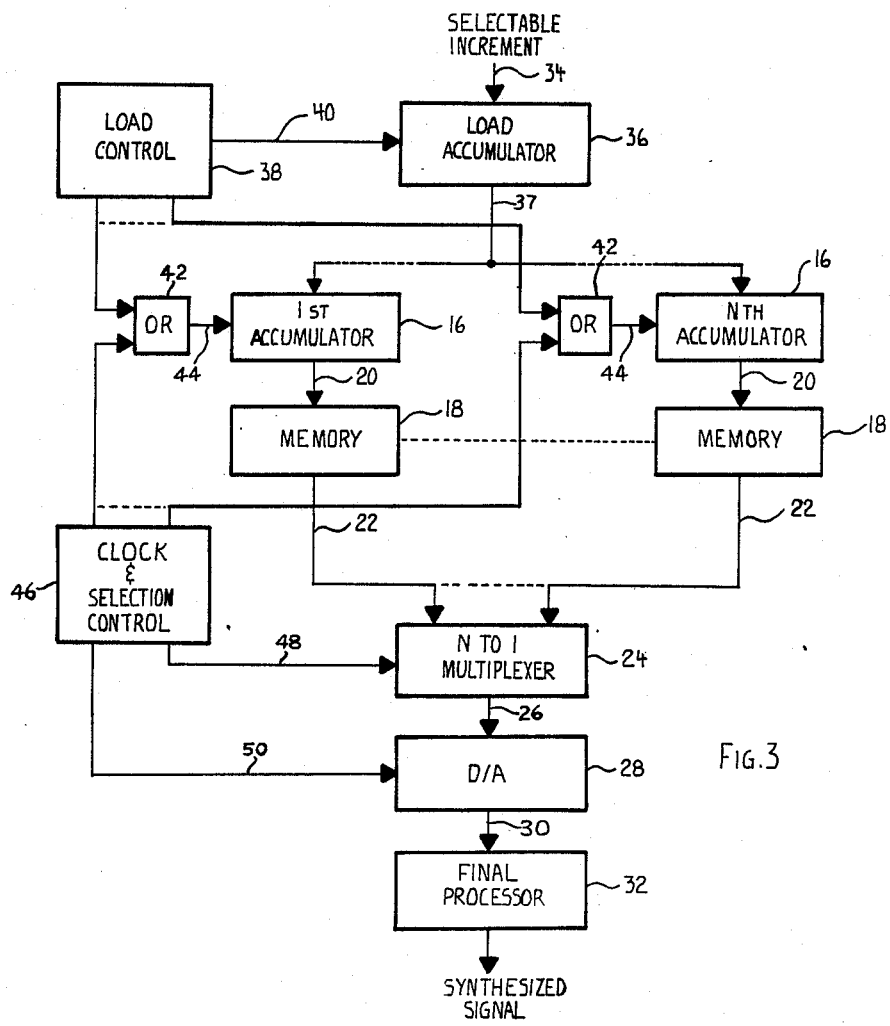
FIG. 3

DIGITAL FREQUENCY SYNTHESIZER HAVING MULTIPLE PROCESSING PATHS

BACKGROUND OF THE INVENTION

This invention relates in general to synthesizers, commonly referred to as "frequency synthesizers", which produce a periodic signal the frequency of which is selectable over a specified range, and in particular to digital frequency synthesizers which employ, in their signal generation process, a selectable-increment counting means to progressively step through a memory containing signal synthesis information.

In conventional digital frequency synthesizers only a single processing path is used to synthesize the signals. A single selectable-increment counting means is used to generate a series of arithmetically progressive memory addresses which are used to index the contents of a single memory, such as a read-only memory (ROM), which contains digitized samples of the signal being synthesized. The digitized samples read from the memory are converted to a sequence of corresponding analog levels, and the analog levels are filtered to remove undesirable high frequency components. The result is a synthesized continuous periodic signal, the frequency of which is determined primarily by the samples from the memory.

In such conventional digital frequency synthesizers, an accumulator is often used as the selectable-increment counting means for progressively indexing the memory. For purposes of this specification, an accumulator is a combination of an arithmetic operator and a data storage register in which the results of arithmetic operations are stored in response to a loading signal, a signal which loads th output of the arithmetic operator into the storage register. The data stored in the register is fed back to the arithmetic operator as an operand (e.g. addend or minuend) for a next succeeding arithmetic operation. Often an accumlator comprises a plurality of integrated circuits connected as serial or parallel operators.

In the operation of an accumulator used as a selectable-increment counting means for frequency synthesis, an increment value derived from, and unique to, a frequency selected by an operator is saved, and the saved increment value is continuously communicated to the accumulator's arithmetic operator as an addend or subtrahend. In this way the saved increment value is continuously added to or subtracted from the contents of the storage register. As a plurality of loading signals (which in this case are more appropriately called "clock signals") are sent to the storage register, the output of the arithmetic operator progresses arithmetically in steps equal to the saved increment value. The contents of the storage register likewise progresses arithmetically (up or down) but always one step behind the arithmetic operator. The accumulator output, which is generally designated to be the contents/output of the storage register, is communicated to the memory as a series of addresses, and as the output of the accumulator increases or decreases by uniform steps equal to the derived increment, the memory is progressively indexed.

The frequency at which the accumulator's storage register is loaded, i.e. the frequency of the clock signal, is actually the counting rate of such an accummulator functioning as a selectable-increment counter. The bandwidth (maximum effective counting rate) of such an accumulator is primarily determined by the bandwidth of the arithmetic operator, the bandwidths of data storage registers typically being orders of magnitude greater than arithmetic operators.

Heretofore, the speed, performance and bandwidth of such conventional digital frequency synthesizers have been primarily limited by the bandwidth, or conversely the throughput delay, of the counting accumulator which is the slowest element with its many gate levels through which information must propagate and settle-out in order to form a valid memory address. In effect the accumulator is the bottle neck because of its propagation delay.

This invention presents a digital frequency synthesizer which is not so bandwidth limited. It has a unique set-up process and multiple processing paths by which the processing of multiple samples is overlapped to overcome the inherent delays of the above-described counting accumulators, resulting in a synthesizer with an overall bandwidth many times greater than conventional synthesizers.

Other advantages and attributes of this invention will be readily discernible upon the reading of the text hereinafter.

SUMMARY OF THE INVENTION

This invention comprises a digital-to-analog conversion means (D/A) which serially receives input in the form of digital data words from a mulitplexer. The multiplexer has some number "N" of data word inputs, each input being in singular communication with one or of N data sourcing paths, each path providing the multiplexer with data words from a memory in the path, the memories preferably being read-only memories (ROM's). The path memories receive address informa-tion from path accumulators, one accumulator communicating with one memory. Prior to accumulating, the path accumulates are preset to initial values by an offset loading control means. When a desired frequency is selected, the offset loading control means initializes the path accumulators in a two step process: (1) the accumulators themselves are loaded with an initial value, and (2) an increment register is loaded with a number equal to N times a primary incremental value derived from and unique to the selected frequency. A first path accumulator is initiality set to zero. The second path accumulator is preloaded, i.e. offset, to the incremental value. The third path accumulator is initially set to two times the incremental value, and so on until the Nth path accumulator is offset by N−1 times the incremental value. From that point on all path accumulators are incremented by the number in the increment register (primary incremental value × N). The accumulators are incremented sequentially at the rate of a master clock, but the multiplexer inputs are sequentially selected at a rate equal to N times the master clock. The multiplexer inputs are selected sequentially in continuous selection cycles, a selection cycle beginning with the selection of the output of the memory in a first path and ending with the selection of the output of the memory in the "Nth" path. The timing is such that proximate the point in time that a multiplexer input is selected, the accumulator of the path associated with the previously selected multiplexer input is incremented, thus giving that path a time equal to a substantial portion of the selection cycle time in which to complete its incrementing process and have a settle memory output before its multiplexer input is once again selected. An input register interposed between, and preferably integral with, the D/A is loaded with a digital data word from the multiplexer output each time a new multiplexer input is selected, but slightly delayed to enable the multiplexer output to settle after having switched inputs. The D/A converts the serially received data words in the input register to a series of corresponding analog levels which are further processed by filter means to provide a continuous periodic signal.

The object of this invention is to provide a frequency synthesizer which is not bandwidth limited by accumualtion circuits used therein.

A further object of this invention is to provide a frequency synthesizer which has a plurality of processing paths through which memory address accumulators are operated in time overlap fashion.

Other objects of this invention will be readily discernible upon reading of the text hereinafter.

BRIEF DESCRIPTION OF THE DRAWINGS

FIG. 1 is a functional block diagram of a prior art accumulator used as a selectable-increment up/down counter.

FIG. 2 is a functional block diagram of a prior art digital frequency synthesizer.

FIG. 3 is a functional block diagram of a digital frequency synthesizer according to this invention.

DESCRIPTION OF THE PREFERRED EMBODIMENT

Figure 4:
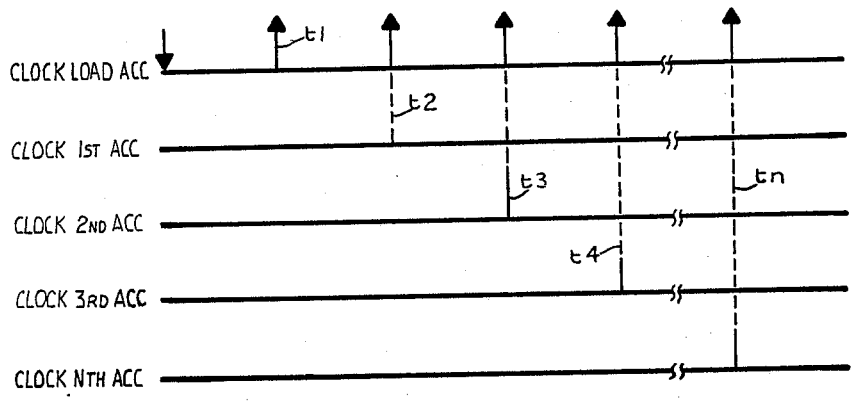
FIG. 4 is timing diagram of a processing path offset initialization cycle.

Referring to FIG. 1, a prior art digital accumulator adapted as a selectable-increment, up or down counter, generally designated 2, is shown to be a combination of an arithmetic operator 4, commonly referred to as an arithmetic unit (AU), and a data storage register 6 in which the results of arithmetic operations are accepted and stored in response to a clock signal. The data stored in the register 6, i.e. the output of register 6, is fed back to a B input of the AU as an operand (e.g. addend or minuend) for a next succeeding arithmetic operation. A selected increment is continuously communicated to an A input of the arithmetic operator as a constant addend or subtrahend. Thus, the selected increment is continuously added to or subtracted from the contents of the data register 6. (Conventionally, the differentiation between an addition or subtraction in an AU is either determined by the form of the inputs, i.e. one input being in two's complement form, or by a control signal which is not shown in FIG 1.) As a result, the output of the AU progresses arithmetically in steps equal to the increment value (selected increment). The content of the storage register 6 likewise progress arithmetically but always one step behind the AU. For example, after the first clock the contents of the data register will equal the selected increment (assuming that initially the contents of the data register 6 was equal to zero which is normally the case following a reset operation), after the second clock it will equal twice the selected increment value, after three clocks it will equal three times the selected increment and so on.

Referring to FIG. 2, an increment value (selected increment) derived from, and unique to, a frequency selected by an operator is saved, and the selected increment value is continuously communicated to an accumulator 8, such as the accumulator shown in FIG. 1, as a constant addend or subtrahend. The accumulator is stepped through an arithmetic progression by a clock which is typically a train of uniformly spaced pulses. The accumulator output is communicated to a memory 10 as progression of addresses, and as the accumulator increases or decreases by uniform steps equal to the selected increment, the memory address likewise increases or decreases, respectively. In response to each address the memory recalls and outputs signal synthesis information in the form of a quantized sample of the form of the signal being synthesized, the value of each word being indicative of the amplitude of the signal being synthesized at the point in time that the sample is recalled. The quantized samples from the memory are communicated to a digital-to-analog convertor (d/a) 12. For each sample the d/a produces an analog signal the amplitude of which corresponds to the amplitude indicated by the sample. The analog signals produced by the d/a are communicated to a final processor 14 which attenuates undesirable signal components and otherwise processes them to make a continuous periodic signal closely matching the selected signal.

Referring to FIG. 3, a digital frequency synthesizer according to this invention has a plurality of parallel processing paths, in this case N paths, each path comnprising an accumulator 16 configured as a selectable-increment counter, such as in FIG. 1, and a companion memory 18 containing signal synthesis information. The accumulator in each processing path provides arithmetically progressive addresses 20 to its companion memory, and in response to each address the memory recalls and outputs signal synthesis information 22 in the form of a digital data word, the value of each word being indicative of the amplitude of the signal being synthesized at or very near the point in time that the word is recalled. The digital data words from each memory are singularly communicated to an input of a multiplexing means 24 adapted to time multiplex at least N such inputs to one output 26. The time multiplexed data words from the multiplexer means are communicated to a digital-to-analog converter (d/a) 28. For each such data word the d/a produces an analog signal 30 the amplitude of which corresponds to the amplitude indicated in the word. The analog signals produced by the d/a are communicated to a final processor 32 which attenuates undesirable signal components and otherwise processes them to make a continuous periodic signal closely matching the selected signal.

Referring again to FIG. 3, an increment 34 derived from, and unique to, a selected frequency is communicated to a load accumulator 36 configured as a selectable-increment counter, such as in FIG. 1. The output 37 of the load accumulator is communicated to all of the path accumulators as the increment for said accumulators. A load control circuit 38 provides a plurality of clocks 40 for the load accumulator. The load control circuit 38 also controls and accomplishes a loading of initial values into the accumulators 16 of the N parallel processing paths by selectively clocking each accumulator 16 through an Or gate 42 associated with the accumulator.

The output 44 of each Or gate 42 is the logical or of a clock signal from the load control circuit 38 and a clock signal from a clock and selection control circuit 46, and said output is communicated to its associated accumulator 16 as a clock signal. In this way each accumulator in the N parallel processing paths can be separately clocked by both the load control circuit 38 and the clock and selection control circuit 46. The clock and selection control circuit 46 also produces and communicates selection signals 48 to the multiplexer 24, the selection signals being a plurality of signals sufficient to define at least N states, each state causing the multiplexer to uniquely select an input, e.g. a processing path, and to pass the current state of the selected input through the multiplexer to its output 26. The clock and selection control circuit 46 also produces and communicates a plurality of register loading signals 50 to the d/a 28 which, in response to each such signal, loads a current data word from the multiplexer 24 into an input register (not shown) which is a part of the d/a. The d/a input register can be integral with the d/a or it can be a separate component. The d/a operates to convert the current contents of the d/a input register to a corresponding analog signal 30.

Referring to FIG. 4, although there are other load mechanisms a timing sequence for the loading of initial values into the path accumulators 16 for one such mechanism is illustrated. The signal synthesis process begins by setting the initial address of each processing path such that they are progressively offset by an amount equal to the selected increment 34. First of all the selected increment 34, in this case X, is set into the load accumulator 36 at time one (t1) by a clock signal 40 from the load control circuit 38, the load accumulator and all of the path accumulators having been previously reset to zero. At time two (t2) the accumulator 16 for the second path is solely set by a clock signal from the load control circuit to the value of the load accumulator 36, which at this time is X, and the load accumulator is clocked to a value of 2X. The first path accumulator is not set from the load accumulator because it has already been set to its initial value of zero by the reset. At time three (t3) the third path accumulator is likewise solely set to a value of 2X and the load accumulator is clocked to a value of 3X. This initiallization process continues until the Nth path accumulator has been solely set to a value of $(N-1)X$ at time N (tn) by a clock from the load control circuit. After the initiallization process is completed, the load accumulator remains constant, until a new frequency is selected, providing a constant increment of NX to all of the path accumulators.

Figure 5:
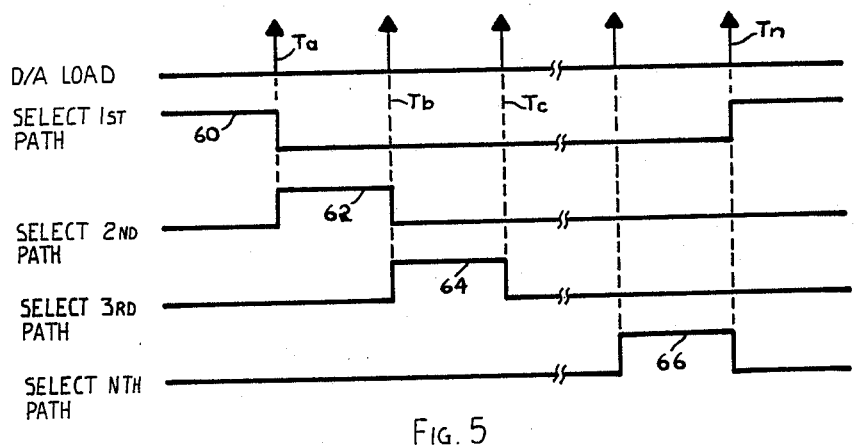
FIG. 5 is a timing diagram of path selection with respect to a d/a load signal.

Referring to FIG. 5, an in-operation timing sequence for the selection of multiplexer 24 inputs and d/a input loading is illustrated. Prior to time A (Ta) the selection signals 48 are in a first state (as illustrated by the first high portion 60 of the SELECT 1st PATH line) whereby a data word at the output of the first processing path is selected and effectively passed through the multiplexer 24. At time A (Ta) the input register of the d/a is loaded from the output of the multiplexer only after the data word from the first path has had sufficient time to effectively pass through the multiplexer and be accurately reflected in the multiplexer's output. Immediately after or coincident with time A, the state of the selection signals 48 is changed to a second state (as illustrated by the high portion 62 of the SELECT 2nd PATH line) whereby a data word at the output of the second processing path is selected and effectively passed through the multiplexer 24. At time B (Tb) the input register of the d/a is loaded from the output of the multiplexer only after the data word from the second path has had sufficient time to effectively pass through the multiplexer and be accurately reflected in the multiplexer's output. Immediately after or coincident with time B, the state of the selection signals 48 is changed to a third state (as illustrated by the high portion 64 of the SELECT 3rd PATH line) whereby a data word at the output of the third processing path is selected and effectively passed through the multiplexer 24. At time C (Tc) the input register of the d/a is loaded from the output of the multiplexer only after the data word from the third path has had sufficient time to effectively pass through the multiplexer and be accurately reflected in the multiplexer's output. This process continues until the Nth processing path is selected (as illustrated by the high portion 66 of the SELECT Nth PATH line) and the input register of the d/a is loaded from the output of the multiplexer only at time N (Tn) after the data word from the Nth path has had sufficient time to effectively pass through the multiplexer and be accurately reflected in the multiplexer's output.

Figure 6:
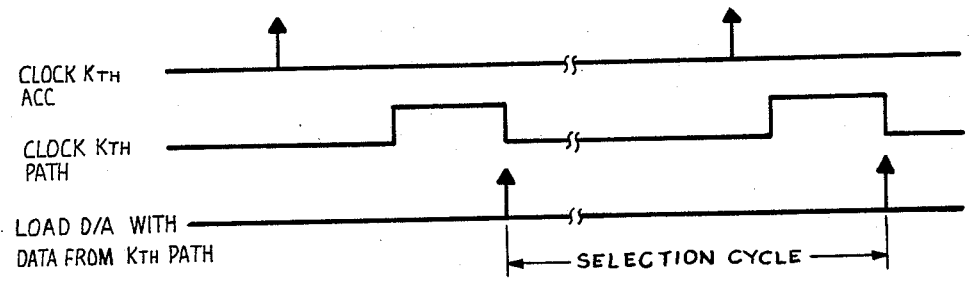
FIG. 6 is a timing diagram of the clock of a Kth accumulator in relation to a selection of the Kth path.

Referring to FIG. 6, the relationship between the clocking of a processing path accumulator and the selection of that path by the clock and selection control circuit 46 is illustrated. Due to the relatively long delay between the time an accumulator is clocked and the time that the incremental change in the accumulator output due to the clock is accurate and stable, and other delays in a processing path beyond the path's accumulator, the accumulator in a processing path must be clocked well in advance of an associated selection of the path. This is accomplished by individually selecting the processing paths in a linearly ordered selection cycle, that is, in each cycle, each processing path is selected once in an ordered fashion. The clock and selection control circuit 46 synchronizes the clocking of path accumulators 16 with path selection such that generally coincident with, or immediately after, the loading of the d/a with a data word from a Kth processing path, the accumulator in the Kth path is clocked for the next selection of that path. For N processing paths being individually selected in an linearly ordered selection cycle, the next selection of the Kth path will occur a full selection cycle later, that is, only after all of the other paths have been subsequently selected. In this way the Kth processing path has essentially the time of a full selection cycle in which to incrementally change and settle-out before the next data word from that path is loaded into the d/a.

The process can be illustrated mathematically. If there are N paths, the path accumulators are intially set as follows:

| 1st Acc. | 2nd Acc. | 3rd Acc. | 4th Acc. | Nth Acc. |
|---|---|---|---|---|
| 0 | X | 2X | 3X | $(N-1)X$ | where X is the primary incremental value derived from and unique to the selected frequency. After a first selection cycle, i.e., after each path accumulator has been incremented once by the value in the load accumulator which is a constant (for the selected frequency) NX, the states of the path accumulators are as follows:

| 1st Acc. | 2nd Acc. | 3rd Acc. | 4th Acc. | Nth Acc. |
|---|---|---|---|---|
| NX | $(N+1)X$ | $(N+2)X$ | $(N+3)X$ | $(2N-1)X$. |

After a second selection cycle, i.e. after they have been incremented twice by NX, their states are as follows:

| 1st Acc. | 2nd Acc. | 3rd Acc. | 4th Acc. | Nth Acc. |
|---|---|---|---|---|
| 2NX | (2N + 1)X | (2N + 2)X | (2N + 3)X | (3N − 1)X | and so on. In each selection cycle, the multiplexer selects the paths in linear order, i.e. it selects the 1st path, then the second path, then the 3rd path, and so on until it has lastly selected the Nth path. Since the contents of the path memories are identical and the selection cycles are continuous, the output of the multiplexer is an ordered series of samples corresponding to an ordered series of memory addresses, i.e. accumulator states as follows:

$$0, X, 2X, \ldots (N-1)X, NX, (N+1)X, \ldots (2N-1)X, 2NX,$$

$$(2N+1)X, \ldots (3N-1)X, 3NX, (3N+1)X \ldots$$

From this it can be seen that the net product of the N parallel processing paths as seen at the output of the multiplexer is a series of quantized samples corresponding to a series of addresses which arithimetically progress in steps equal to the selected primary increment X. Because of the physical limitations of the accumulators, the address series periodically repeats itself.

From the foregoing it can be seen that the bandwidth of a frequency synthesizer according to this invention is not limited in bandwidth by an accumulator element. The bandwidth is essentially that of the d/a which is, in the current state of art, much greater than accumulators. If the maximum clocking rate of the d/a is X, then for N parallel processing paths the path accumulators need only be clocked at the substantially reduced rate of X/N.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A frequency synthesizer comprising:
   (a) a plurality of processing paths to provide synthesis information in real-time about a signal being synthesized, each path providing a portion of the total information required to synthesize the signal, each processing path comprising:
      (1) a selectable-increment counting means for producing a progressive series of counts in response to a train of clock signals, and (2) a memory means containing a plurality of data words and operative to recall and output a data word in response to and associated with each count, each data word containing signal synthesis information about a signal being synthesized,
   (b) means for time ordering the information from the processing paths into an ordered data word stream,
   (c) a means for converting the data word stream into the signal being synthesized,
   (d) means for progressively offsetting the counts in the respective paths' counting means at the start of synthesis in relation to each other by integer multiples of an increment derived from the frequency of the signal being synthesized, and
   (e) means for providing during synthesis a constant increment for all of the paths' counting menas equal to the number of paths times the derived increment.

2. A synthesizer of a periodic signal of selectable frequency comprising:
   (a) means for providing a primary numerical increment corresponding to a frequency of a selected signal,
   (b) a plurality of parallel processing paths each path comprising:
      (1) means for producing a uniformly spaced in time, repeating series of numerical addresses which arithmetically progress in steps equal to said primary numerical increment times the number of parallel processing paths, the series beginning with an initial address,
      (2) means for providing quantized samples of a signal being synthesized in response to said addresses, one sample per address, the quantum of each sample so provided corresponding to the magnitude of said signal at the point in time that said sample is provided,
   (c) means for setting the Initial address of each processing path such that said paths are progressively offset by an amount equal to said primary numerical increment,
   (d) means for time ordering the samples from all of the processing paths such that they are uniformly interlaced In time, and
   (e) means for processing the time ordered samples into a continuous signal.

3. The synthesizer according to claim 2 wherein the means in each path for producing the numerical addresses comprises a selectable-increment counter responsive to a clock signal, wherein the means for time ordering the samples from the paths comprises a multiplexer which individually selects the paths in response to selection signals, and further comprising cyclical means for providing in a suitable order a single clock signal to each path counter during each cycle and for providing selection signals to cause the multiplexer to select each path once during each cycle and in the same order, the clocking of each path counter in a cycle preceding the selection of said path by a substantial portion of said cycle.

4. The synthesizer according to claim 3 wherein the means for setting the initial addresses of each path comprises:
   (a) a selectable-increment load counter which is set to zero whenever a new frequency is selected and whose increment is the primary numerical increment corresponding to the newly selected frequency, the output of said counter communicating with each path counter as an increment value,
   (b) means for setting all path counters to zero whenever a new frequency is selected,
   (c) means for providing clocks equal in number to the number of parallel processing paths plus one to the load counter and a clock signal to each path counter except a first path counter, the clocks being provided as follows: a first clock to the load counter followed after a suitable delay by a clock signal to a second path counter, a second clock to the load counter followed after a suitable delay by a clock signal to a third path counter, and so on until the last path counter is clocked following an last clock to the load counter, the load counter being clocked one more time thereafter so that its state after all path counters have been clocked is the number of parallel processing paths times the primary increment value.

5. The synthesizer according to claim 4 wherein the selectable-increment counter of each path comprises an accumulator which continuously receives the primary numerical increment times the number of parallel processing paths as one addend and whose output is fed back as a second addend.

6. The synthesizer of claim 4 wherein the means in each path for providing quantized samples comprises a memory which is preloaded with said samples, the contents of all of said path memories being identical.

7. The synthesizer according to claim 3 wherein the selectable-increment counter of each path comprises an accumulator which continuously receives the primary numerical increment times the number of parallel processing paths as one addend and whose output is fed back as a second addend.

8. The synthesizer of claim 7 wherein the means in each path for providing quantized samples comprises a memory which is preloaded with said samples, the contents of all of said path memories being identical.

9. The synthesizer of claim 2 wherein the means in each path for providing quantized samples comprises a memory which is preloaded with said samples, the contents of all of said path memories being identical.

10. The synthesizer of claim 3 wherein the means in each path for providing quantized samples comprises a memory which is preloaded with said samples, the contents of all of said path memories being identical.

* * * * *

UNITED STATES PATENT AND TRADEMARK OFFICE
CERTIFICATE OF CORRECTION

PATENT NO. : 4,958,310

DATED : September 18, 1990

INVENTOR(S) : Bar-Giora Goldberg

It is certified that error appears in the above-identified patent and that said Letters Patent is hereby corrected as shown below:

Column 7, claim 1, item (e), line 68, "menas" should be corrected to --means--.

Signed and Sealed this

Nineteenth Day of May, 1992

Attest:

DOUGLAS B. COMER

*Attesting Officer*  *Acting Commissioner of Patents and Trademarks*